(12) United States Patent
Mazzotto

(10) Patent No.: US 10,864,672 B2
(45) Date of Patent: Dec. 15, 2020

(54) DEVICE FOR BLOW MOLDING CONTAINERS

(71) Applicant: SACMI IMOLA S.C., Imola (IT)

(72) Inventor: Filippo Mazzotto, San Pietro di Feletto (IT)

(73) Assignee: SACMI IMOLA S.C., Imola (IT)

( * ) Notice: Subject to any disclaimer, the term of this patent is extended or adjusted under 35 U.S.C. 154(b) by 363 days.

(21) Appl. No.: 15/779,769

(22) PCT Filed: Nov. 21, 2016

(86) PCT No.: PCT/EP2016/078298
§ 371 (c)(1),
(2) Date: May 29, 2018

(87) PCT Pub. No.: WO2017/089296
PCT Pub. Date: Jun. 1, 2017

(65) Prior Publication Data
US 2020/0307063 A1      Oct. 1, 2020

(30) Foreign Application Priority Data
Nov. 27, 2015   (IT) .................. 102015000077553

(51) Int. Cl.
*B29C 49/56* (2006.01)
*B29C 49/48* (2006.01)
(Continued)

(52) U.S. Cl.
CPC ............. *B29C 49/56* (2013.01); *B29C 49/36* (2013.01); *B29C 49/48* (2013.01);
(Continued)

(58) Field of Classification Search
CPC . B29C 49/56; B29C 49/36; B29C 2049/4892; B29C 49/48
See application file for complete search history.

(56) References Cited

U.S. PATENT DOCUMENTS

| | | | | |
|---|---|---|---|---|
| 2010/0203185 A1* | 8/2010 | Litzenberg | ............... | B29C 49/56 425/522 |
| 2014/0030373 A1* | 1/2014 | Graffin | .................... | B29C 49/36 425/540 |
| 2016/0250797 A1* | 9/2016 | Michel | .................... | B29C 49/56 425/150 |

FOREIGN PATENT DOCUMENTS

CN      201872329 U      6/2011
CN      103171126 A      6/2013
(Continued)

OTHER PUBLICATIONS

International Search Report dated Jan. 23, 2017 re: Application No. PCT/EP2016/078298, pp. 1-3.
(Continued)

*Primary Examiner* — Robert B Davis
(74) *Attorney, Agent, or Firm* — Cantor Colburn LLP

(57) ABSTRACT

A device for blow molding containers, which is provided with a supporting frame for at least one station for blow molding preforms in order to obtain containers, the blow molding station including two lateral bodies and a bottom which are adapted to provide by blow molding at least one container, at least one of the two lateral bodies being movable on command by way of means for cyclic opening and closing, with respect to the supporting frame, about an articulation axis that is substantially parallel to the axis of the at least one container, means being provided for kinematic connection between the at least one movable lateral body and the bottom and being adapted to produce cyclically the movement of the bottom along a movement direction substantially parallel to the; the cyclic opening and closing means include an actuation body which is supported by a first link rod which can be moved with respect to the supporting frame about a pivoting axis which is substantially parallel to the articulation axis (101), the first link rod being
(Continued)

kinematically connected to the at least one movable lateral body and being associated rotatably with a contoured body that defines a cam-like profile that can be engaged by at least one engagement element supported by the bottom.

9 Claims, 3 Drawing Sheets

(51) Int. Cl.
   *B29C 49/36* (2006.01)
   *B29K 67/00* (2006.01)
   *B29L 31/00* (2006.01)

(52) U.S. Cl.
   CPC .. *B29C 2049/4892* (2013.01); *B29K 2023/06* (2013.01); *B29K 2067/003* (2013.01); *B29L 2031/7158* (2013.01)

(56) References Cited

FOREIGN PATENT DOCUMENTS

| | | |
|---|---|---|
| CN | 203901699 U | 10/2014 |
| DE | 102009042788 A1 | 3/2011 |
| DE | 202013009941 U1 | 11/2013 |
| EP | 2202047 A1 | 6/2010 |
| FR | 2841495 A1 | 1/2004 |
| JP | 2010526690 A | 8/2010 |
| WO | 2006029585 A1 | 3/2006 |
| WO | 2007012309 A2 | 2/2007 |
| WO | 2008138293 A1 | 11/2008 |
| WO | 2010122481 A2 | 10/2010 |

OTHER PUBLICATIONS

Written Opinion dated Jan. 23, 2017 re: Application No. PCT/EP2016/078298, pp. 1-5.

\* cited by examiner

DEVICE FOR BLOW MOLDING CONTAINERS

CROSS REFERENCE TO RELATED APPLICATION

This application is related to and claims the benefit of Italian Patent Application No. 102015000077553 (UB2015A005974) filed on Nov. 27, 2015, the disclosure of which is incorporated herein by reference in its entirety.

TECHNICAL FIELD

The present disclosure relates to a device for blow molding plastic containers, and in particular containers made of PET, PE, PEN and similar materials.

BACKGROUND

Systems are known for blow molding plastic containers which comprise an apparatus for blow molding preforms, consisting of blow molding stations arranged on rotating advancement wheels and with the mold support pivoted in the manner of a book.

Apparatuses are likewise known wherein the blow molding stations are fixed (these are adapted in particular to accommodate cavities for forming containers): in this case, for mold supports what are usually used are plates arranged parallel to each another.

The execution of the movements to open and close the blow molding station, as well as the execution of the movements to lift the base portion (or bottom) is usually actuated mechanically.

In blow molding stations arranged on rotating advancement wheels, curved segments (cams) are used in particular, which are arranged fixed on the chassis of the machine, along which tappet rollers are conducted, which are connected with the elements to be moved.

WO2007/012309 discloses a blow molding station wherein the base portion is moved longitudinally with respect to the blow molding station and wherein one mold support is fixed while the other support can move.

FR2841495 discloses a mold that has a base portion that can move axially with respect to the lateral supports of the mold.

WO2006/029585 discloses a blow molding station wherein there is a mechanical coupling between the lateral supports of the mold and the base portion.

In order to seek to obtain a high degree of compactness, it is preferable to use solutions that have one lateral support of the mold fixed and one movable but, in this case, it becomes problematic to manage the movement to lift the base portion or bottom since, in order to ensure an optimal blow molding, it is essential to obtain a shape mating between the lateral supports of the mold and the base portion.

EP 2144742 B1 in the name of KHS CORPOPLAST discloses a device for blow molding containers which is provided with a blow molding station that is arranged on a supporting structure for molding preforms.

In this case the blow molding station is provided with two lateral walls of the mold and with a base portion or bottom.

One of the lateral walls is fixed while the other one can be oriented with respect to the supporting structure.

The bottom can move with respect to each of the two lateral walls of the mold.

Specifically, the lateral walls of the mold are coupled together mechanically to execute positioning movements, while the bottom has a movement trajectory, with respect to the lateral walls, which has both a component that extends in a longitudinal direction of the blow molding station and also a component that extends transversely to the longitudinal direction.

The above proposed solution presents a certain level of implementation complexity owing to the movement trajectory of the bottom.

BRIEF SUMMARY

The aim of the present disclosure is to solve the above mentioned problems and overcome the drawbacks, by providing a device for blow molding plastic containers that is extremely easy and practical in use.

Within this aim, the disclosure provides a device for blow molding plastic containers that is extremely simple in terms of construction and is capable of enabling an optimal management of the process.

The disclosure further provides a blow-molding device that is flexible in its use.

BRIEF DESCRIPTION OF THE DRAWINGS

Further characteristics and advantages of the disclosure will become better apparent from the description of some preferred, but not exclusive, embodiments of a device for blow molding plastic containers according to the disclosure, which are illustrated by way of non-limiting example in the accompanying drawings wherein.

DETAILED DESCRIPTION

Figure 1:
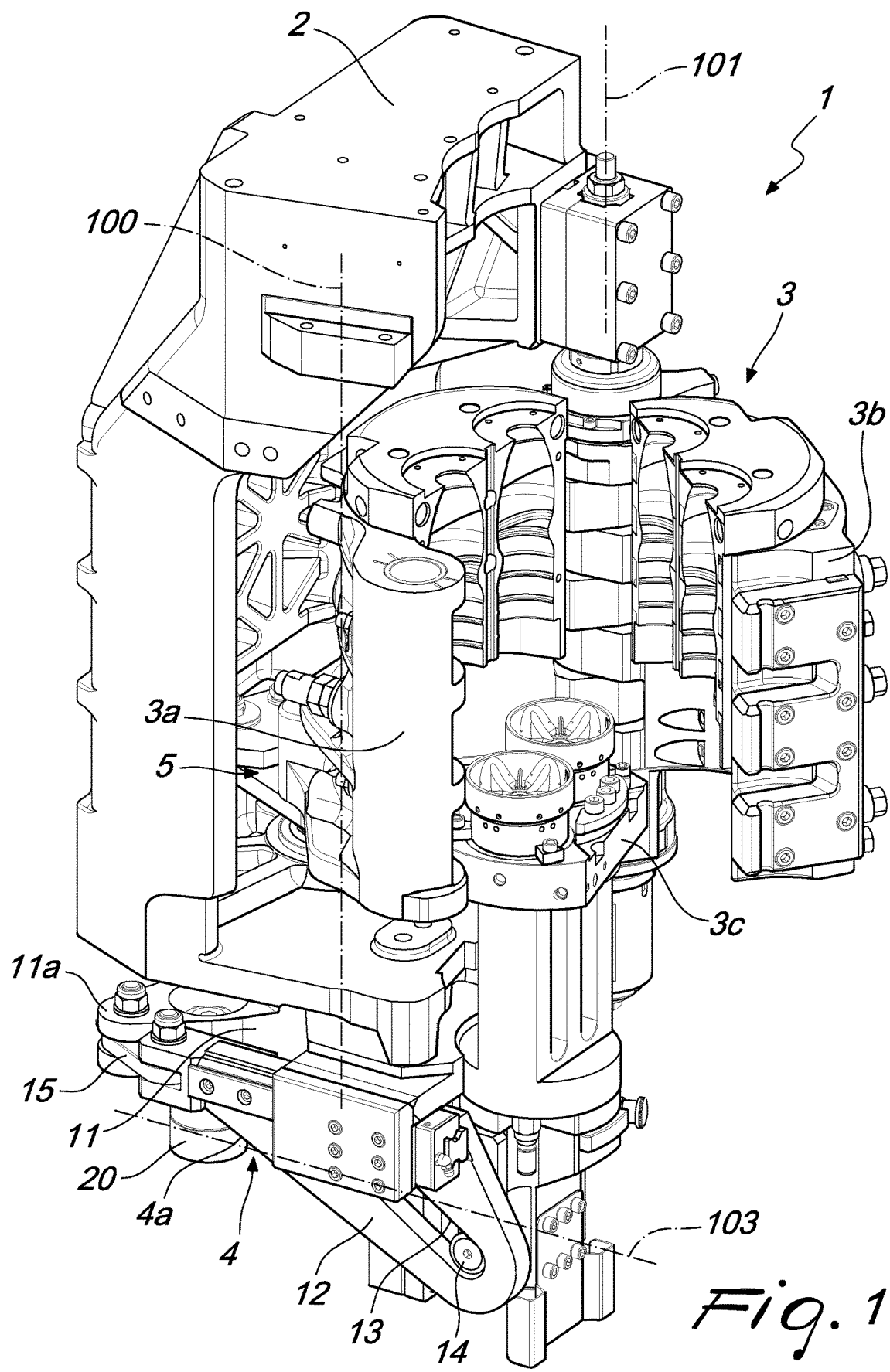
FIG. 1 is a perspective view of a device for blow molding plastic containers according to the disclosure, during the step of opening the blow molding station.
Figure 2:
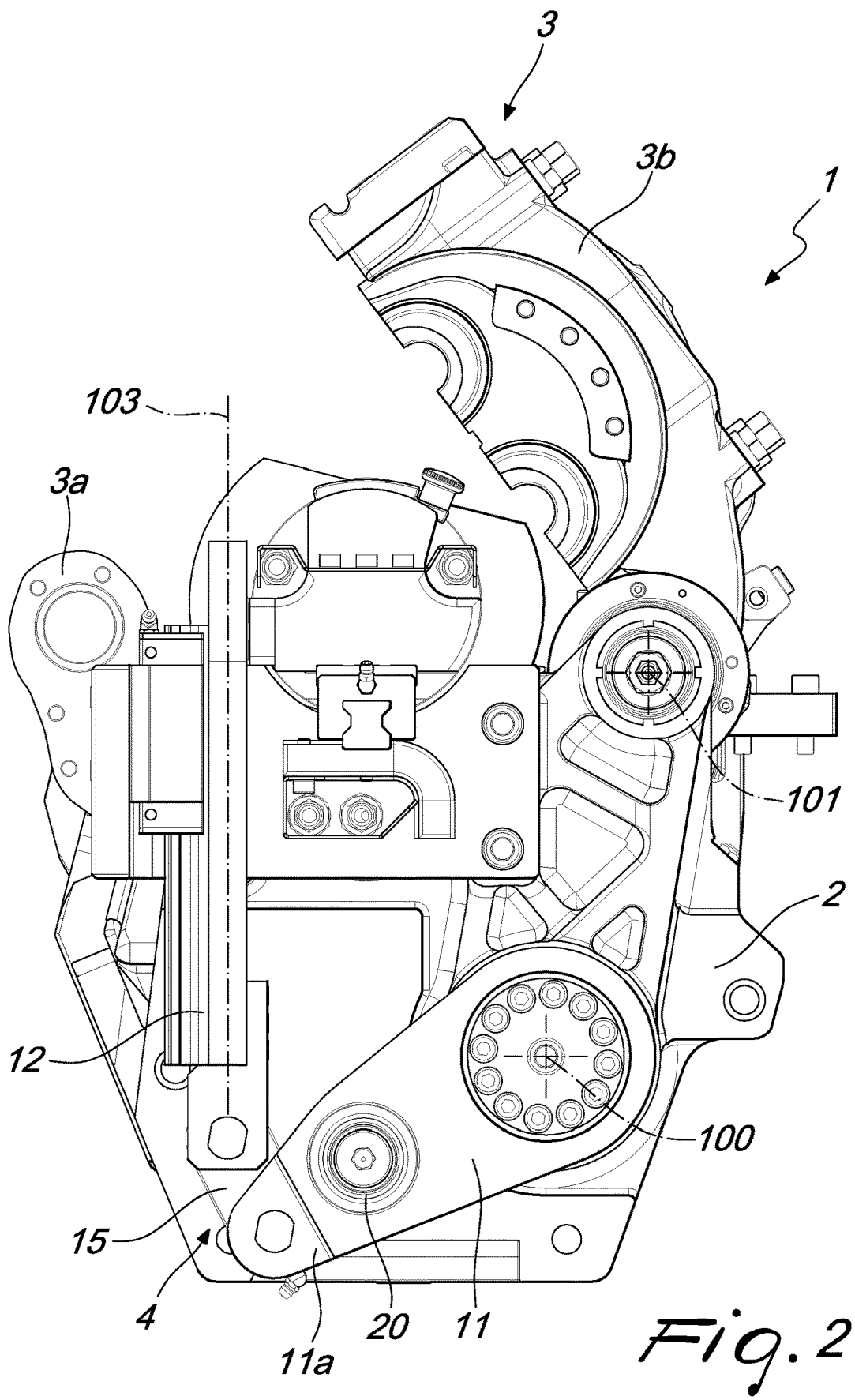
FIG. 2 is a view from below of the blow molding station of FIG. 1.
Figure 3:
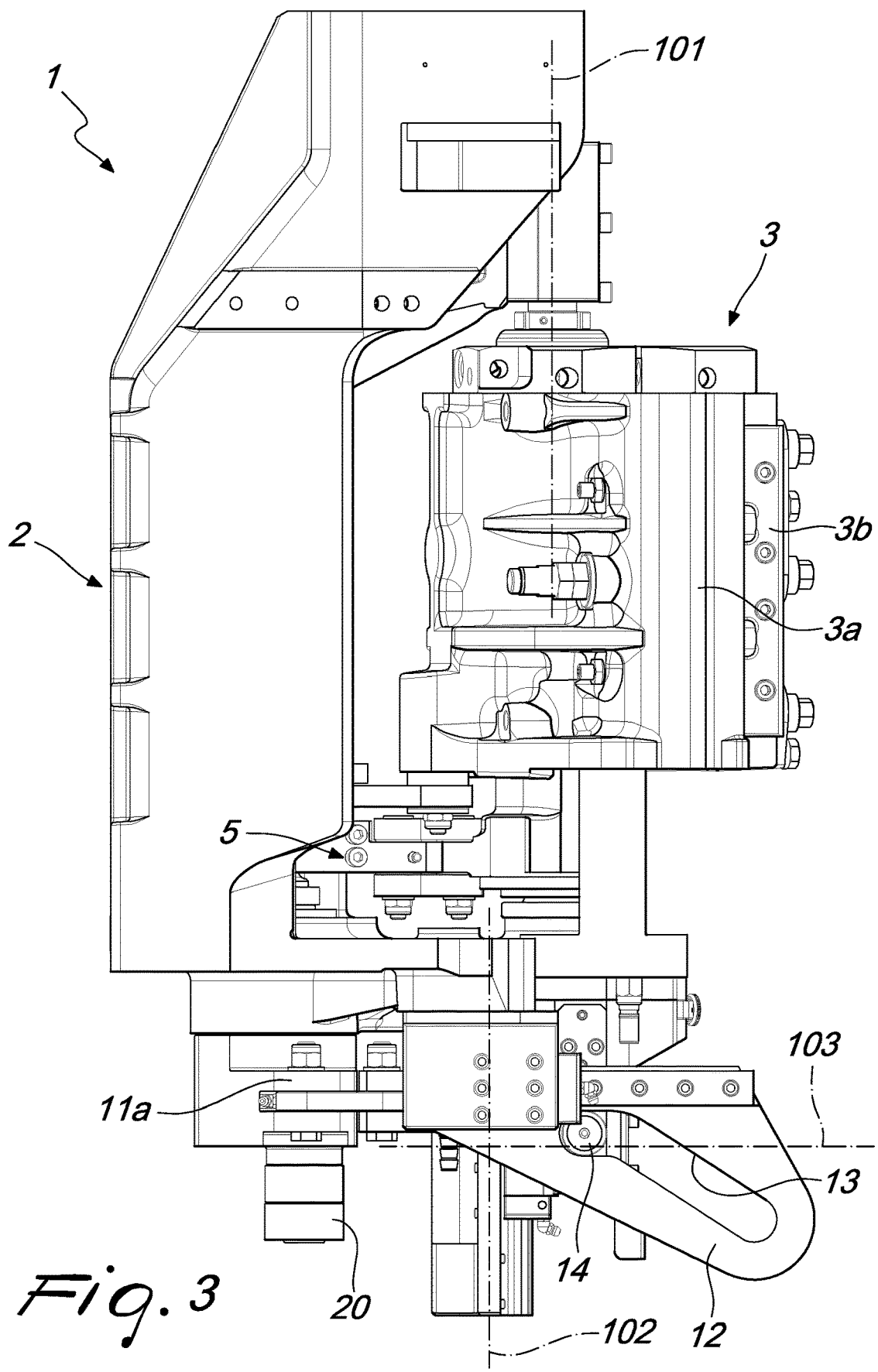
FIG. 3 is a side view of the blow molding station during the closure step.

In the embodiments illustrated below, individual characteristics shown in relation to specific examples may in reality be interchanged with other, different characteristics, existing in other embodiments.

With reference to the figures, a device for blow molding containers according to the disclosure, is generally designated by the reference numeral 1.

The device 1 has a supporting frame 2 for at least one station 3 for blow molding preforms in order to obtain containers.

The blow molding station 3 comprises two lateral bodies 3a, 3b and a bottom 3c.

The two lateral bodies 3a, 3b and the bottom 3c are adapted to provide by blow molding at least one container.

At least one of the two lateral bodies 3a, 3b is movable on command, by way of cyclic opening and closing means, with respect to the supporting frame 2, about an articulation axis 101, which is substantially parallel to the axis of the container or containers.

According to the present disclosure, the device 1 is provided with means 4 of kinematic connection between at least the movable lateral body 3a and the bottom 3c.

In particular, the kinematic connection means 4 are adapted to produce cyclically the movement of the bottom 3c along a movement direction 102 that is substantially parallel to the articulation axis 101.

According to the present disclosure, the cyclic opening and closing means comprise an actuation body 20 supported by a first link rod 11.

The first link rod 11 can be moved, with respect to the supporting frame 2, about a pivoting axis 100 which is substantially parallel to the articulation axis 101.

The first link rod 11 is kinematically connected at least to the movable lateral body 3a and is associated rotatably with a contoured body 12, which defines a cam-like profile 13 that can be engaged by at least one engagement element 14 supported by the bottom 3c.

In practice, the movement, with respect to the supporting frame 2, of the first link rod 11 about the pivoting axis 100 produces, cyclically, the movement along the movement direction 102 of the bottom 3c and the opening and the closing, by way of rotation about the articulation axis 101, of the movable lateral body 3a.

Advantageously, the device 1 comprises an element 5 for kinematic connection between the movable lateral body 3a and the other lateral body 3b.

In particular, the kinematic connection element is adapted to produce, as a consequence of the rotation of the movable lateral body 3a, the rotation of the other lateral body 3b about the articulation axis 101.

Conveniently, the kinematic connection element 5 is adapted to produce, as a consequence of the rotation of the movable lateral body 3a through a first angular extent about the articulation axis 101, a rotation of the other lateral body 3b through a second angular extent about the articulation axis 101.

Preferably, the second angular extent is greater than the first angular extent.

Conveniently, the kinematic connection element 5 comprises a lever system for motion transfer, which connects the movable lateral body 3a to the other lateral body 3b.

It is likewise possible to have different methods of transferring motion from the link rod 11 to the lateral bodies 3a and 3b: by way of example, there is no reason not to use two separate kinematic connection elements that connect the link rod 11 respectively to the movable lateral body 3a and to the other lateral body 3b in order to actuate their rotation independently.

The contoured body 12 can move along a movement trajectory 103, which is defined on a plane of arrangement that is substantially parallel to a plane defined by the pivoting axis 100 and by the movement direction 102 of the bottom 3c.

Preferably, the engagement element 13 comprises, for example, an idle roller, which can optionally also be eccentric.

Specifically, the movement trajectory 103 extends substantially at right angles to the movement direction of the bottom 3c.

Conveniently, the kinematic connection means 4 comprise a guiding link rod 15 which is associated rotatably at its ends, respectively, with the first link rod 11 and with the contoured body 12.

The link rod 11 is connected kinematically, by way of an actuation lever system, to the mold lateral body 3a.

Preferably, the actuation lever system is connected to the end of the link rod 11 that is arranged opposite the end associated with the contoured body.

Specifically, it is possible for the end with which the actuation lever system is associated to define the pivoting axis 100.

Preferably, each blow molding station 3 internally defines two cavities for obtaining a respective container.

The device 1 according to the disclosure comprises a footing associated with a carousel structure, which can rotate, with respect to the footing, about an axis of the carousel.

In particular, the axis of the carousel is substantially parallel to the articulation axis 101.

The carousel structure supports, preferably at its peripheral region, a plurality of blow molding stations 3.

The footing supports, furthermore, at least one engagement track for the actuation bodies 20 of the blow molding stations 3.

In this manner, during the rotation of the blow molding stations 3 about the axis of the carousel, a rotation is produced of the respective link rods 11 about the respective pivoting axis 100.

The rotation, with oscillating motion, of the link rods 11 about the respective pivoting axis 100 produces the opening and the closing of the lateral bodies 3a and 3b, by virtue of the interposition of the actuation lever system and of the motion transfer lever mechanism, and the lifting and lowering of the bottom 3c by virtue of the action of the contoured body 12.

The disclosure, thus conceived, is susceptible of numerous modifications and variations, all of which are within the scope of the appended claims.

In practice the materials employed, provided they are compatible with the specific use, and the dimensions and shapes, may be any according to requirements.

Moreover, all the details may be substituted by other, technically equivalent elements.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs

The invention claimed is:

1. A device for blow molding containers, which is provided with a supporting frame for at least one station for blow molding preforms in order to obtain containers, said blow molding station comprising two lateral bodies and a bottom which are adapted to provide by blow molding at least one container, at least one of said two lateral bodies being movable on command by way of means for cyclic opening and closing, with respect to said supporting frame, about an articulation axis that is substantially parallel to the axis of said at least one container, means being provided for kinematic connection between said at least one movable lateral body and said bottom and being adapted to produce cyclically the movement of said bottom along a movement direction substantially parallel to said articulation axis, wherein said cyclic opening and closing means comprise an actuation body which is supported by a first link rod which can be moved with respect to said supporting frame about a pivoting axis which is substantially parallel to said articulation axis, said first link rod being kinematically connected to said at least one movable lateral body and being associated rotatably with a contoured body that defines a cam-like profile that can be engaged by at least one engagement element supported by said bottom.

2. The device according to claim 1, further comprising an element for kinematic connection between said movable lateral body and the other lateral body, said kinematic connecting element being adapted to produce, as a consequence of the rotation of said movable lateral body about an articulation axis, the rotation about the same articulation axis of the other lateral body.

3. The device according to claim 2, wherein said kinematic connection element is adapted to produce, as a consequence of the rotation of said movable lateral body through a first angular extent about said articulation axis, a rotation of the other lateral body through a second angular extent about said articulation axis, said second angular extent being greater than said first angular extent.

4. The device according to claim 1, further comprising an actuation lever system that connects said link rod to said movable lateral body.

5. The device according to claim 2, wherein said kinematic connection element comprises a lever system for motion transfer, which connects said movable lateral body to the other lateral body.

6. The device according to claim 1, wherein said contoured body can move along a movement trajectory that is defined on a plane of arrangement that is substantially parallel to a plane defined by said articulation axis and by said movement direction of said bottom.

7. The device according to claim 1, wherein said at least one engagement element comprises an idle roller.

8. The device according to claim 5, wherein said lever system comprises a guiding link rod which is associated rotatably at its ends respectively with said first link rod and with said contoured body.

9. The device according to claim 1, further comprising a footing associated with a carousel structure which can rotate, with respect to said footing, about an axis of the carousel that is substantially parallel to said articulation axis and which supports a plurality of blow molding stations, said footing supporting at least one engagement track for the actuation bodies so as to produce, during the rotation of said blow molding stations about the axis of the carousel, a rotation of the respective link rods about the respective pivoting axis.

* * * * *